R. L. NOTMAN.
MOTOR CYCLE FRAME.
APPLICATION FILED JUNE 18, 1919.
1,420,638.
Patented June 27, 1922.
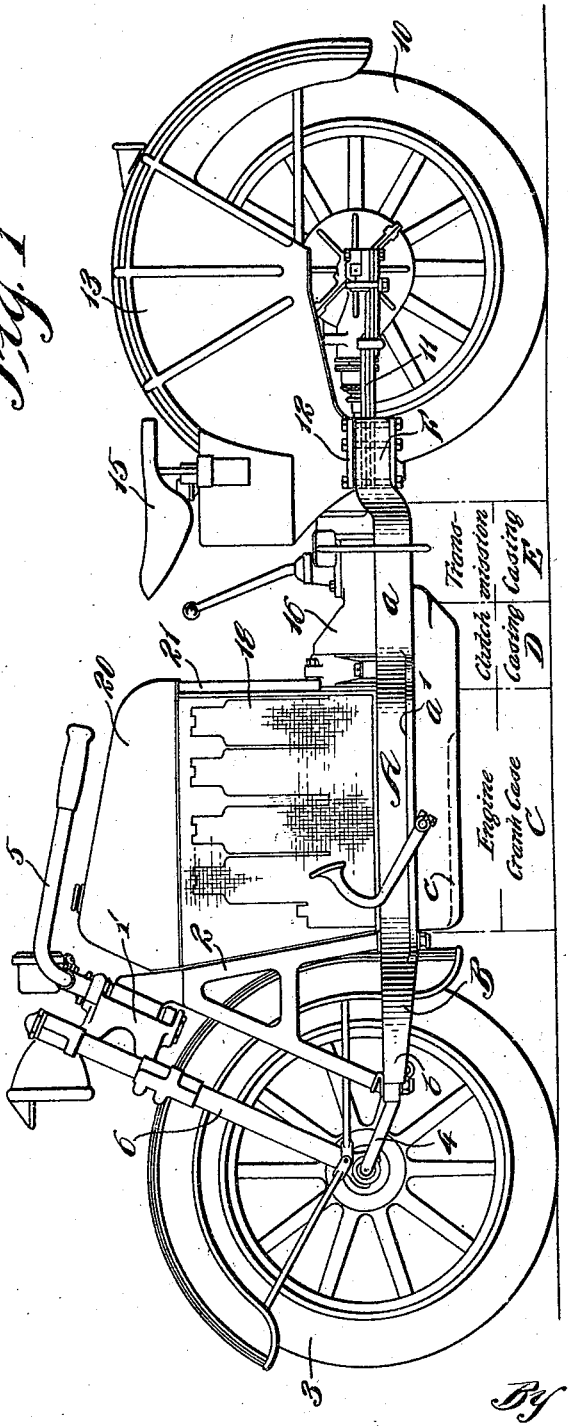
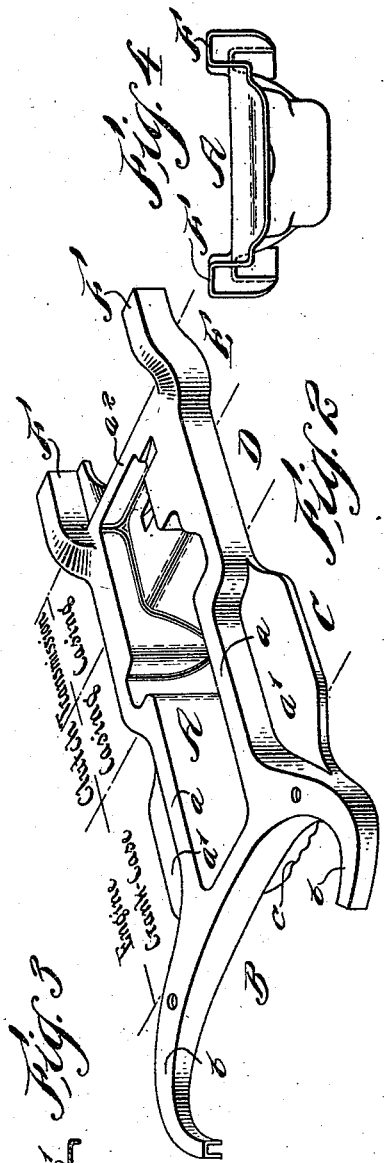

UNITED STATES PATENT OFFICE.

ROBERT L. NOTMAN, OF SPRINGFIELD, MASSACHUSETTS, ASSIGNOR TO THE MILITOR CORPORATION, OF NEW YORK, N. Y., A CORPORATION OF NEW YORK.

MOTOR-CYCLE FRAME.

1,420,638.     Specification of Letters Patent.     Patented June 27, 1922.

Application filed June 18, 1919. Serial No. 305,005.

*To all whom it may concern:*

Be it known that I, ROBERT L. NOTMAN, a citizen of the United States, residing at Springfield, in the county of Hampden and State of Massachusetts, have invented a certain new and useful Improvement in Motor-Cycle Frames, of which the following is a full, clear, and exact description, reference being had to the accompanying drawings.

This invention relates to improvements in motorcycles, and its aims are to simplify and strengthen the construction, facilitate assembly, and otherwise expedite and cheapen the manufacture of vehicles of the class mentioned.

Further objects are to materially reduce the number of separate parts which ordinarily go to make up a motorcycle frame, thus avoiding the multitude of joints which work loose and cause considerable annoyance if not more serious trouble; to eliminate the numerous dirt and grease collecting cracks and crevices so that cleaning is rendered much easier than heretofore; and to improve, generally, the appearance of the vehicle.

The invention consists in making the main frame or chassis of the motorcycle of a one-piece sheet metal stamping and incorporating in this integral unit, according to my present preferred design, the lower halves of the engine crank case, clutch and transmission casings, with provision for connecting the secondary frame elements, etc., to the unit.

In the accompanying drawing, Fig. 1 is a side view of a motorcycle equipped with my improved main frame; Fig. 2 is a perspective view of the main frame; Fig. 3 is a transverse section through that portion of the frame constituting the lower half of the engine crank case; and Fig. 4 is a rear end elevation of the frame.

The main frame as a whole is designated A and for the convenience of description is divided longitudinally into five zones, the first consisting of the forked end B; the second, indicated at C, constituting mainly the engine crank case; the third, D, comprising the lower half of the clutch case; the fourth, E, including the lower half of the transmission casing; and the fifth, the sockets F for the springs through which the frame is suspended from the rear wheel.

Structurally, the frame is made up of side members $a$ which merge at their forward ends into the branches $b$ of the forked end B, and at their rear ends the side members are turned outwardly and upwardly to form the spring sockets F. Foot-boards $a'$ are shown as formed integral with the opposed side members incidentally within zone C. The material within this zone, between the side members $a$ and to the rear of the forked end B, is drawn down to a suitable depth to form the lower half of the engine crank case and the bottom of the case is corrugated longitudinally, as indicated at $c$, to strengthen the structure and afford greater area to the bottom of the crank case to enhance the cooling of the oil. The portion of the frame between the rear end of the crank case and a transverse frame member $a^2$ that extends between the spring sockets F, is formed to accommodate the clutch and transmission mechanisms.

The steering head 1 of the vehicle is supported a suitable distance above the forward or forked end of the main frame through A-shaped brackets 2. The front or steering wheel 3 is mounted upon a bearing element 4 which is connected in a suitable manner to the forward end of the frame, and said wheel is adapted to be turned by means of handle bars 5 through the intervention of forks 6 and the steering head wherewith the forks have connection at their upper ends. The rear end of the main frame is suspended from the rear or driving wheel 10 through springs 11 which have their forward ends clamped within the sockets F of the main frame by means of spring clips indicated generally at 12. The upper half of the rear wheel 10 is enclosed within a suitable mud-guard or fender 13 which has rigid connection with the rear end of the main frame and supports a seat or saddle 15.

The upper halves of the clutch and transmission casings are shown as formed of an integral member 16 and the same is connected by suitable means to the side members of the main frame; and the upper half of the engine crank casing, indicated at 18, may be connected along each side and across the front to the corresponding parts of the main frame. A fuel tank 20 is shown as supported above the engine by having its forward end connected to the upper ends of brackets 2, and its rear end attached, through a member 21, with the clutch casing.

In assembling the parts, the main frame may be suspended from the wheels, and the engine, clutch, and transmission mechanisms properly assembled within the upper halves of their respective casings and then lowered upon the main frame and secured thereto.

My invention, it will be seen, provides for making of a single piece of sheet metal what has heretofore been constructed of numerous parts, with the result that my improved structure is more rigid and durable than the types of motorcycle frames heretofore used and is cheaper and more convenient of manufacture.

Having thus described my invention, what I claim is:—

1. A motorcycle main frame formed of a single piece of sheet metal and comprising side rails of downwardly opening channel formation merging at their forward ends into forks.

2. A motorcycle main frame formed of a single piece of sheet metal and comprising side rails of downwardly opening channel formation terminating at their forward ends in forks designed to embrace a front wheel, and at their rear ends in spring attaching elements, so arranged that springs attached thereto will constitute forks for embracing a rear wheel.

3. A motorcycle main frame formed of a single piece of sheet metal and comprising side rails of downwardly opening channel formation from which integral foot supports extend laterally.

4. A motorcycle main frame formed of an integral piece of sheet metal and comprising side rails terminating at their forward ends in fork branches and at their rear ends in spring attaching elements, the portion between the side rails being shaped to constitute portions of the engine and transmission mechanism casings.

In testimony whereof, I hereunto affix my signature.

ROBERT L. NOTMAN.